United States Patent
Yukitake

(10) Patent No.: US 7,602,594 B2
(45) Date of Patent: Oct. 13, 2009

(54) MOTOR CONTROL APPARATUS AND MOTOR CONTROL METHOD

(75) Inventor: Yasuhiro Yukitake, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 266 days.

(21) Appl. No.: 11/617,294

(22) Filed: Dec. 28, 2006

(65) Prior Publication Data

US 2007/0145835 A1   Jun. 28, 2007

(30) Foreign Application Priority Data

Dec. 28, 2005   (JP) .............................. 2005-377861

(51) Int. Cl.
*H02H 5/04* (2006.01)

(52) U.S. Cl. .............................. 361/25; 361/23; 361/29; 361/30; 361/33; 318/775; 318/778; 477/5; 477/175; 477/166

(58) Field of Classification Search ................. 318/775, 318/778; 361/25, 29, 33, 23, 30; 477/5, 477/175, 166

See application file for complete search history.

(56) References Cited

U.S. PATENT DOCUMENTS

| 5,483,139 | A * | 1/1996 | Welles, II ................. 318/782 |
| 6,932,738 | B2 * | 8/2005 | Aoki et al. ..................... 477/5 |
| 7,217,223 | B2 * | 5/2007 | Saeki et al. ................. 477/175 |

FOREIGN PATENT DOCUMENTS

JP   5-137383   6/1993

* cited by examiner

*Primary Examiner*—Rita Leykin
(74) *Attorney, Agent, or Firm*—Oblon, Spivak, McClelland, Maier & Neustadt, L.L.P.

(57) ABSTRACT

To provide a motor control apparatus, including a rotational number detecting means for detecting the rotational number of a motor; a current detecting means for detecting a motor current; a voltage detecting means for detecting an impressed voltage to be supplied to a motor; a temperature estimating means for obtaining a motor temperature from the rotational number of a motor, the motor current, and the impressed voltage; and a protection signal generating means for generating an operational signal in order to protect the motor when the obtained motor temperature exceeds a predetermined value.

8 Claims, 3 Drawing Sheets

MOTOR CONTROL APPARATUS AND MOTOR CONTROL METHOD

BACKGROUND OF THE INVENTION

1. Field of the Invention

The present invention relates to a control apparatus of an electric motor, which is used for an electric pump for a drive-train (a transmission) and a control method of the electric motor.

When the periphery of the transmission is subjected to a high temperature, a winding wire of the motor is also subjected to a high temperature (not less than 150° C.) so as to cause adverse effects on duration of life of the motor. In order to prevent such adverse effects, the following apparatus for protecting the motor has been known.

Conventionally, as described in Patent Document 1 (Japanese Patent-Application Laid-Open No. 05-137383), the motor is protected by using a temperature sensor to convert temperature change of the motor into a voltage and outputting it. By automatically stopping the operation of this motor when the temperature of the motor rises so as to hold the stopping state, a reliability of the protection operation against rise in temperature is improved. In addition, a motor control apparatus with a temperature sensor has been known because this motor control apparatus can arbitrarily and easily set the motor temperature where the protection device is operated by adjusting a reference voltage of a comparator to compare the reference voltage with the output voltage of the temperature sensor.

The apparatus for controlling the motor by detecting a temperature by means of the temperature sensor described in Patent Document 1 has the following problems. It is difficult to attach a temperature sensor to a motor stator. A process and a cost for attaching the temperature sensor are needed.

Since a lead wire of the temperature sensor is required to be attached to a driver, the number of man-hour for assembly is increased.

SUMMARY OF THE INVENTION

An object of the present invention is to provide a motor control apparatus and a motor control method, which can obtain the same advantage as the case that a temperature sensor is used even when the temperature sensor is not used, by using an existing apparatus, and can render the number of man-hour for assembly unnecessary. A motor control apparatus according to the present invention may comprise a rotational number detecting means for detecting the rotational number of a motor; a current detecting means for detecting a motor current; a voltage detecting means for detecting an impressed voltage to be supplied to a motor; a temperature estimating means for obtaining a motor temperature from the rotational number of a motor, the motor current, and the impressed voltage; and a protection signal generating means for generating an operational signal in order to protect the motor when the obtained motor temperature exceeds a predetermined value.

A current of the motor and the rotation number of the motor are changed depending on the effect of a temperature, and the rotation number of the motor is also changed due to the influence of the impressed voltage. Therefore, correlation data among the motor current, the rotation number of the motor, a motor temperature, and a motor voltage are accumulated in a temperature estimating means, and the temperature estimating means may estimate the motor temperature by using this correlation data.

The rotation number of the motor, the motor current, and the impressed voltage obtained from each detecting means are inputted in an operation unit having the temperature estimating means and a protection signal generating means, and the operation unit may control a drive circuit for driving the motor on the basis of these data and a control signal transmitted from an upper controller.

The temperature estimating means may obtain an estimated value of a temperature of the motor from measurement values of the rotation number of the motor, the motor current, and the impressed voltage.

The protection signal generating means may stop the operation of the motor and decrease a load of the current if the temperature of the motor obtained by the temperature estimating means is high, and thereby, damage and change of the motor are prevented. In the protection signal generating means, for example, a first predetermined temperature (for example, 100° C.) and a second predetermined temperature higher than the first predetermined temperature (for example, 130° C.) are determined, and the protection signal generating means may output a load reduction signal when the estimated (obtained) temperature exceeds the first predetermined temperature, and may output an operation stop signal when the estimated (obtained) temperature exceeds the second predetermined temperature.

A motor control method according to the present invention may comprise the steps of detecting the rotation number of a motor; detecting a motor current; detecting an impressed voltage to be supplied (impressed) to a motor; obtaining (estimating) a temperature of the motor from the rotation number of a motor, the motor current and the impressed voltage; and generating an operational signal for protecting the motor when the obtained temperature of the motor exceeds a predetermined value.

The estimating step can estimate (obtain) the temperature of the motor via a program on the basis of the motor current, the motor current, the rotation number of the motor, and the impressed voltage are included in a particular combination.

The motor control apparatus and the motor control method according to the present invention are preferable for controlling a motor, which is formed to be integral with an electric pump (an electric internal pump) for a drive-train (transmission) of an automobile. The motor is considered, for example, a brushless motor, and more preferably, the motor is considered a sensorless and brushless motor. In the case of attaching a position detecting sensor and a rotation sensor to a motor of an electric pump for a drive-train, durability of the sensors against a high temperature becomes a problem since a place where the motor of an electric pump for a drive-train is arranged is easily subjected to a high temperature. However, by using the sensorless and brushless motor, this problem can be solved. Then, by controlling this sensorless and brushless motor while estimating a motor temperature without using of the temperature sensor, it is possible to obtain a motor having more improved durability and safety under a high temperature environment.

Since the rotation number of the motor, the motor current, and the impressed voltage are the data necessary for monitoring the motor, a means for detecting these data is normally provided to an existing motor control apparatus and a new means for detecting these data is not necessarily added. As a result, by newly adding a program to realize the temperature estimating means and the operation unit, this motor control apparatus can be obtained as the constitution of hardware remained unchanged.

DETAILED DESCRIPTION OF THE INVENTION

Figure 1:
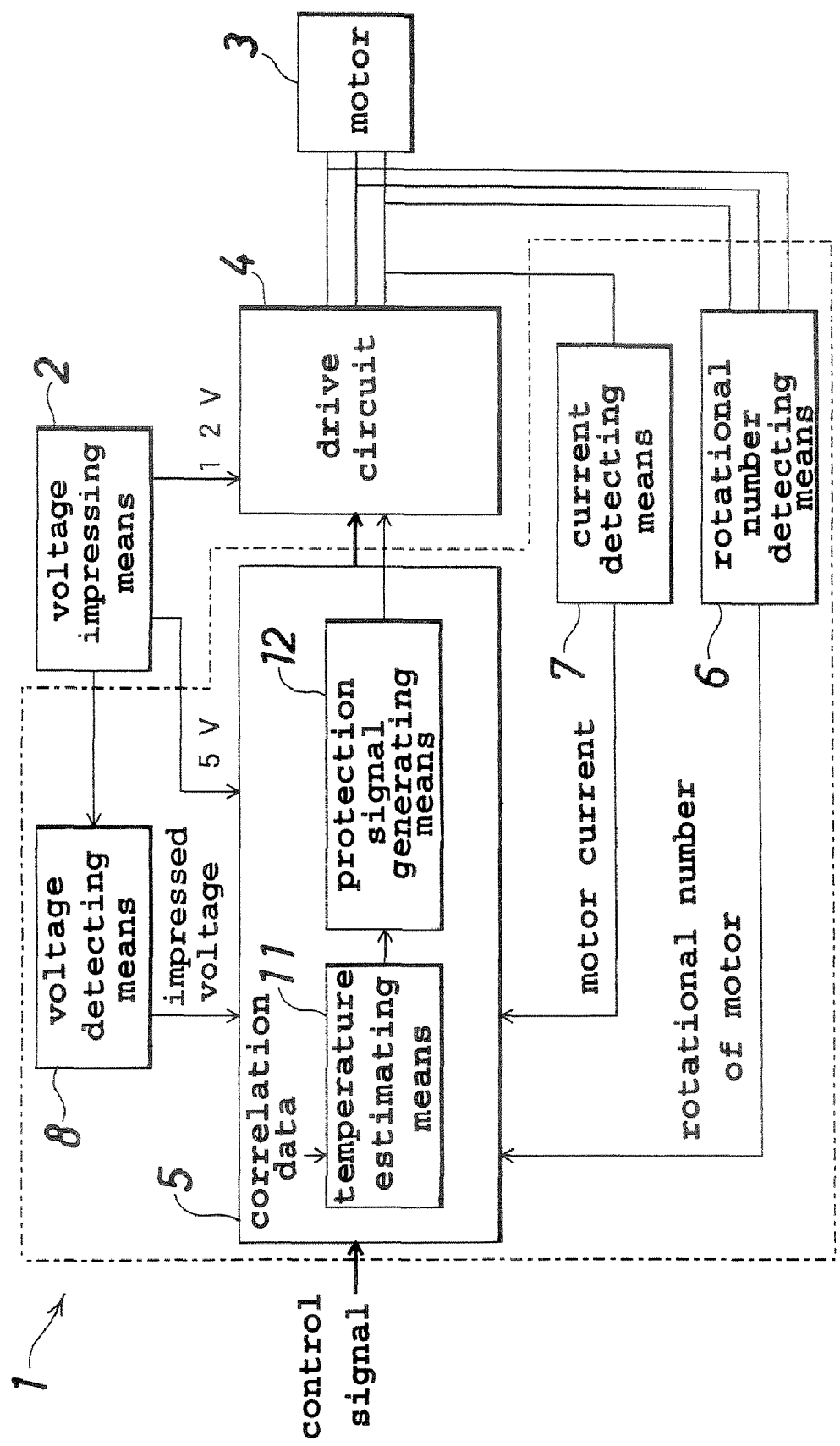
FIG. 1 is a block diagram of a motor control apparatus and a control method according to the present invention.

An embodiment of the present invention will be described below with reference to the drawings.

As shown in FIGS. 1 to 5, a motor control apparatus (1) according to the present invention is provided with an operation unit (5) for controlling a drive circuit (4) of a motor (3) a rotational number detecting means (6) for detecting the rotational number of the motor, a current detecting means (7) for detecting a motor current, and a voltage detecting means (8) for detecting an impressed voltage to be supplied from a voltage impressing means (2) to the motor (3).

The motor (3) is integrated with the electric pump for the drive-train and the motor (3) is used under a high temperature atmosphere.

The drive circuit (4) is formed by a circuit for controlling the motor (3) on the basis of a signal transmitted from the operation unit (5).

The operation unit (5) is provided with a temperature estimating means (11) for obtaining a motor temperature without using of a temperature sensor and a protection signal generating means (12) for generating an operational signal in order to protect the motor when the obtained motor temperature exceeds a predetermined value.

The rotational number detecting means (6) may detect the rotational number of the motor by connecting a rotational number measuring circuit to the motor.

The current detecting means (7) may detect the motor current by connecting a current measuring circuit to the motor.

The voltage detecting means (8) may detect the impressed voltage to be impressed to the drive circuit (4) as being connected between the voltage impressing means (2) and the operation unit (5).

The voltage impressing means (2) is considered a power supply circuit and the voltage impressing means (2) may apply 5V to the operation unit (5) and 12V to the drive circuit (4), respectively.

The rotational number of the motor, the motor current, and the impressed voltage, which are obtained by respective detecting means (6), (7), and (8) are inputted in the operation unit (5), and the operation unit (5) may control the drive circuit (4) on the basis of a control signal transmitted from these data and the upper controller.

The correlation data for obtaining the motor temperature from the rotational number of the motor, the motor current, and the impressed voltage are accumulated in the temperature estimating means (11), and the temperature estimating means (11) is constantly obtaining the estimated value of the motor temperature from the measurement values of the rotational number of the motor, the motor current, and the impressed voltage, which are changed with time.

The protection signal generating means (12) is provided with a determination program to determine if the motor temperature obtained by the temperature estimating means (11) is appropriate or not. Then, if the estimated motor temperature is a high temperature, the protection signal generating means (12) may output a load reduction signal in order to protect the motor to the drive circuit.

The correlation data to be accumulated in the temperature estimating means (11) will be described below with reference to FIGS. 2 through 5.

Figure 2:
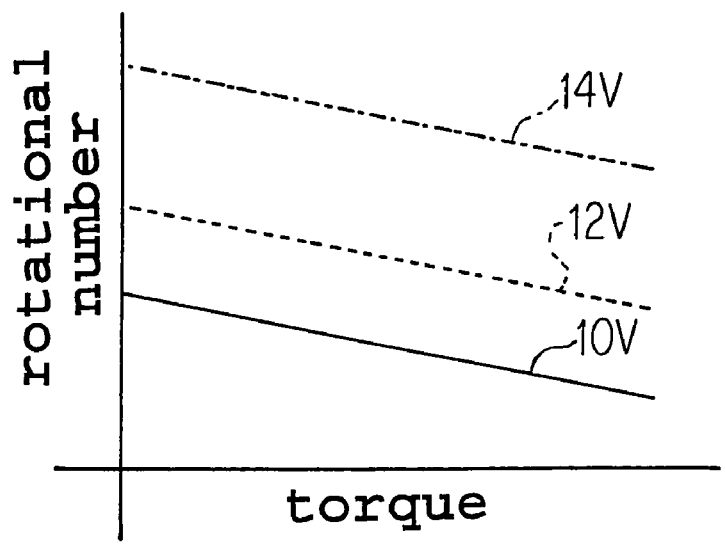
FIG. 2 is correlation data showing a relation between the rotational number and a torque having a voltage as a parameter.

A graph shown in FIG. 2 shows a relation between the rotational number and a torque having a voltage as a parameter. In FIG. 2, a relation between the rotational number and the torque is represented by downward-sloping lines, and 14V, 12V, and 10V are represented by these lines from above.

In the graph of FIG. 2, when the voltage is 12V, if an arbitrary torque value is determined, the rotational number is obtained from the line of 12V.

Figure 3:
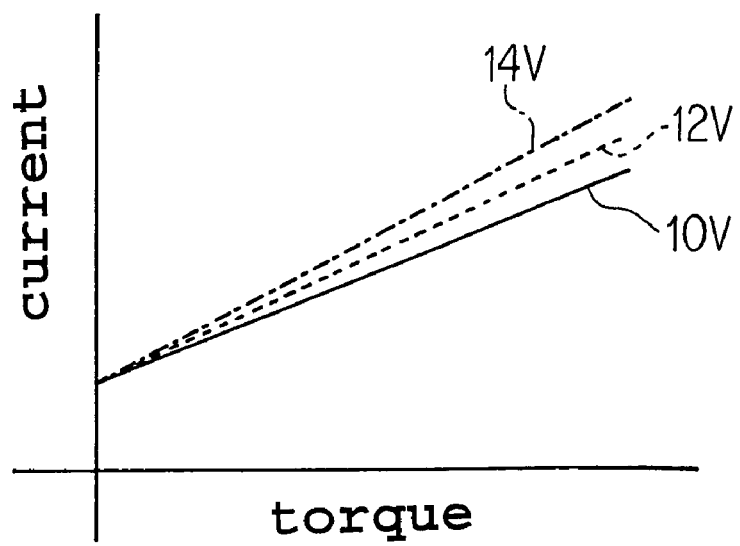
FIG. 3 is correlation data showing a relation between a current and a torque having a voltage as a parameter.

In addition, the graph shown in FIG. 3 shows a relation between a current and a torque having a voltage as a parameter. In FIG. 3, a relation between the current and the torque is represented by upward-sloping lines, and 14V, 12V, and 10V are represented by these lines from above.

In the graph of FIG. 3, when the voltage is 12V, if an arbitrary torque value is determined, the current is obtained from the line of 12V.

Figure 4:
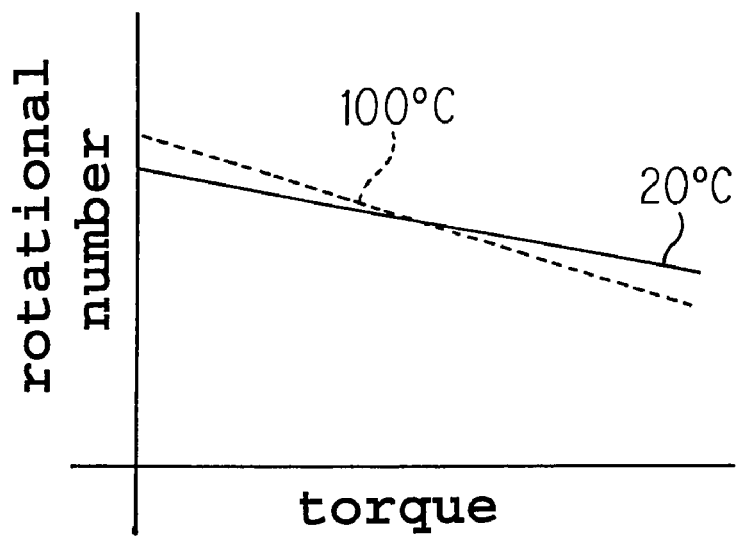
FIG. 4 is correlation data showing a relation between the rotational number and a torque having a temperature as a parameter.

In addition, the graph shown in FIG. 4 shows a relation between the rotational number and a torque having a temperature as a parameter. In FIG. 4, a voltage is held constant, and a relation between the rotational number and the torque is represented by a downward-sloping solid line of 20° C. and a downward-sloping broken line of 100° C.

The solid line of 20° C. and the broken line of 100° C. cross each other, and a left side from the cross point is defined as a low torque area and a right side therefrom is defined as a high torque area.

In the low torque area, the rotational number is less when the temperature is low, and the rotational number is more when the temperature is high.

In the high torque area, the rotational number is more when the temperature is low, and the rotational number is less when the temperature is high.

In the graph of FIG. 4, by obtaining the rotational number at a predetermined torque number, if this rotational number is positioned on a line of 20° C., it is possible to estimate that the temperature is 20° C. In addition, if the obtained rotational number is positioned in the middle of the solid line of 20° C. and the broken line of 100° C., it is possible to estimate that the temperature is 60° C.

Figure 5:
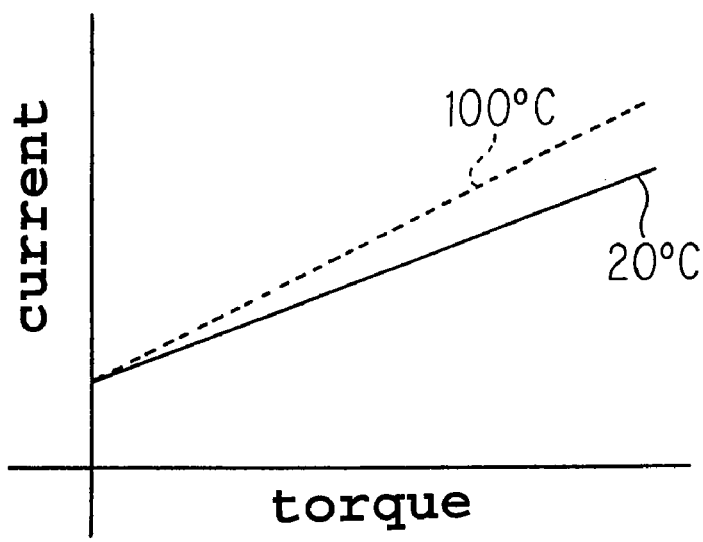
FIG. 5 is correlation data showing a relation between a current and a torque having a temperature as a parameter.

The graph shown in FIG. 5 shows a relation between a current and a torque having a temperature as a parameter.

In FIG. 5, the data of the temperature due to the relation between the current and the torque is represented by an upward-sloping solid line of 20° C. and an upward-sloping broken line of 100° C. The solid line of 20 C. and the broken line of 100° C. cross each other at a place where the torque is near 0 [N·m].

In the graph of FIG. 5, by obtaining the current at a predetermined torque number, if this current is positioned on a line of 20 C., it is possible to estimate that the temperature is 20° C. In addition, if the obtained current is positioned in the middle of the solid line of 20° C. and the broken line of 100° C., it is possible to estimate that the temperature is 60° C.

Thus, the motor temperature can be obtained without using of the temperature sensor, and the load of the motor (3) is reduced before the motor (3) is subjected to a dangerous temperature by carrying out the control according to this motor temperature.

What is claimed is:

1. A motor control apparatus, comprising:
a rotational number detecting means for detecting the rotational number of a motor;
a current detecting means for detecting a motor current;
a voltage detecting means for detecting an impressed voltage to be supplied to a motor;
a temperature estimating means for obtaining a motor temperature from the rotational number of a motor, the motor current, and the impressed voltage, wherein the temperature estimating means includes a map comparing the rotational number or current to a motor parameter at different temperatures and for a constant voltage; and
a protection signal generating means for generating an operational signal in order to protect the motor when the obtained motor temperature exceeds a predetermined value.

2. The motor control apparatus according to claim 1, wherein the temperature estimating means has a correlation data accumulating unit, in which the correlation data among the motor current, the rotational number of the motor, the motor temperature, and the motor voltage are accumulated.

3. A motor control apparatus, comprising:
a rotational number detecting means for detecting the rotational number of a motor;
a current detecting means for detecting a motor current;
a voltage detecting means for detecting an impressed voltage to be supplied to a motor;
a temperature estimating means for obtaining a motor temperature from the rotational number of a motor, the motor current, and the impressed voltage; and
a protection signal generating means for generating an operational signal in order to protect the motor when the obtained motor temperature exceeds a predetermined value,
wherein the protection signal generating means outputs a load reduction signal when an estimated temperature exceeds a first predetermined temperature, and outputs an operation stop signal when the estimated temperature exceeds a second predetermined temperature.

4. The motor control apparatus according to claim 1, wherein the motor is a sensorless and brushless motor, which is formed to be integrated with an electric pump for a transmission of an automobile.

5. A motor control method, comprising the steps of:
detecting the rotation number of a motor;
detecting a motor current;
detecting an impressed voltage to be supplied to a motor;
obtaining a temperature of the motor from the rotation number of a motor, the motor current and the impressed voltage by comparing the rotational number or current to a motor parameter at different temperatures and for a constant voltage; and
generating an operational signal for protecting the motor when the obtained temperature of the motor exceeds a predetermined value.

6. A motor control method, comprising the steps of:
detecting the rotation number of a motor;
detecting a motor current;
detecting an impressed voltage to be supplied to a motor;
obtaining a temperature of the motor from the rotation number of a motor, the motor current and the impressed voltage; and
generating an operational signal for protecting the motor when the obtained temperature of the motor exceeds a predetermined value,
wherein, in the protection signal generating step, a load reduction signal is outputted when the obtained temperature exceeds a first predetermined temperature, and an operation stop signal is outputted when the obtained temperature exceeds a second predetermined temperature.

7. The motor control apparatus according to claim 1, wherein the temperature estimating means includes a first map comparing the rotational number to motor torque at different temperatures and for a constant voltage, and a second map comparing the current to motor torque at different temperatures and for a constant voltage.

8. The motor control method according to claim 5, wherein the step of obtaining a temperature of the motor comprises at least one of comparing the rotational number to motor torque at different temperatures and for a constant voltage, and comparing the current to motor torque at different temperatures and for a constant voltage.

* * * * *